United States Patent
Kim

(10) Patent No.: US 10,606,789 B2
(45) Date of Patent: Mar. 31, 2020

(54) APPLICATION MODULE PROVIDED WITH STATIONARY INTERFACE

(71) Applicant: LG CHEM, LTD., Seoul (KR)

(72) Inventor: Jihoon Kim, Daejeon (KR)

(73) Assignee: LG CHEM, LTD., Seoul (KR)

(*) Notice: Subject to any disclaimer, the term of this patent is extended or adjusted under 35 U.S.C. 154(b) by 255 days.

(21) Appl. No.: 14/890,212

(22) PCT Filed: Oct. 31, 2014

(86) PCT No.: PCT/KR2014/010347
§ 371 (c)(1),
(2) Date: Nov. 10, 2015

(87) PCT Pub. No.: WO2015/065091
PCT Pub. Date: May 7, 2015

(65) Prior Publication Data
US 2016/0132458 A1 May 12, 2016

(30) Foreign Application Priority Data

Oct. 31, 2013 (KR) .................. 10-2013-0130745

(51) Int. Cl.
*G06F 13/42* (2006.01)
*H01M 10/42* (2006.01)
(Continued)

(52) U.S. Cl.
CPC .......... *G06F 13/4282* (2013.01); *G06F 13/28* (2013.01); *H01M 10/425* (2013.01);
(Continued)

(58) Field of Classification Search
None
See application file for complete search history.

(56) References Cited

U.S. PATENT DOCUMENTS 8,850,091 B1 * 9/2014 Karamcheti ........ G06F 12/0246
710/62
10,338,919 B2 * 7/2019 Boswell .............. G06F 9/30014
(Continued)

FOREIGN PATENT DOCUMENTS

KR 10-2006-0112776 A 11/2006
KR 10-2011-0061429 A 6/2011
(Continued)

OTHER PUBLICATIONS

Machine English translation of KR-10-2006-0112776-A, dated Nov. 2, 2006.
(Continued)

*Primary Examiner* — Steven G Snyder
*Assistant Examiner* — Christopher A Bartels
(74) *Attorney, Agent, or Firm* — Birch, Stewart, Kolasch & Birch, LLP

(57) ABSTRACT

Provided is an application module provided with a stationary interface, and more particularly, an application module performing functions of a battery management system (BMS), which transceives data from an application module data control device or calls a service module included in a basic program (basic software (BSW) to increase compatibility regarding function execution among one or more modules.

9 Claims, 5 Drawing Sheets

(51) Int. Cl.
*H01M 10/48* (2006.01)
*G06F 13/28* (2006.01)

(52) U.S. Cl.
CPC .. *H01M 10/482* (2013.01); *H01M 2010/4271* (2013.01); *H01M 2010/4278* (2013.01); *H01M 2220/20* (2013.01)

(56) References Cited

U.S. PATENT DOCUMENTS

| | | | |
|---|---|---|---|
| 2001/0016789 A1* | 8/2001 | Staiger | B60R 16/0231 701/1 |
| 2002/0009978 A1* | 1/2002 | Dukach | G06Q 30/02 455/99 |
| 2002/0012055 A1* | 1/2002 | Koshiba | G06T 1/60 348/273 |
| 2002/0135683 A1* | 9/2002 | Tamama | G06T 1/60 348/222.1 |
| 2007/0042767 A1* | 2/2007 | Stepanian | G06F 1/1626 455/420 |
| 2007/0117515 A1* | 5/2007 | Sinibaldi | H04B 17/21 455/67.11 |
| 2007/0280144 A1* | 12/2007 | Hodson | G05B 19/4185 370/312 |
| 2008/0279204 A1* | 11/2008 | Pratt, Jr. | G01D 21/00 370/406 |
| 2009/0168849 A1* | 7/2009 | Rouxel | H04B 1/707 375/140 |
| 2010/0271509 A1* | 10/2010 | Marumoto | H04N 5/765 348/231.99 |
| 2010/0280995 A1* | 11/2010 | Munegowda | G06F 11/1435 707/648 |
| 2011/0078092 A1 | 3/2011 | Kim et al. | |
| 2011/0273309 A1* | 11/2011 | Zhang | A61B 5/7465 340/870.07 |
| 2012/0191400 A1* | 7/2012 | Sontakke | G01R 31/31724 702/119 |
| 2012/0215391 A1 | 8/2012 | Schaefer et al. | |
| 2013/0158762 A1 | 6/2013 | An et al. | |
| 2013/0249277 A1 | 9/2013 | Park et al. | |
| 2014/0101771 A1* | 4/2014 | Tandon | G06F 21/00 726/26 |
| 2014/0200850 A1* | 7/2014 | Muldowney | G06F 17/00 702/182 |
| 2014/0273833 A1* | 9/2014 | McCormack | H04B 5/0037 455/41.1 |
| 2015/0162068 A1* | 6/2015 | Woo | G11C 11/40615 365/222 |
| 2015/0162925 A1* | 6/2015 | Lee | H03M 1/1295 250/208.1 |
| 2015/0294363 A1* | 10/2015 | Bhola | G06Q 30/0266 705/14.63 |
| 2016/0104522 A1* | 4/2016 | Son | G11C 11/005 711/103 |
| 2016/0179696 A1* | 6/2016 | Zmudzinski | G06F 12/1009 711/163 |
| 2017/0115344 A1* | 4/2017 | Kuehnis | G01R 31/31715 |
| 2017/0200505 A1* | 7/2017 | Jin | H05K 999/99 |
| 2018/0004979 A1* | 1/2018 | Niell | G06F 21/70 |
| 2018/0114007 A1* | 4/2018 | Kim | G06F 21/32 |

FOREIGN PATENT DOCUMENTS

| | | |
|---|---|---|
| KR | 10-2012-0069705 A | 6/2012 |
| KR | 10-2013-0052276 A | 5/2013 |
| KR | 10-2013-0068160 A | 6/2013 |
| KR | 10-2013-0087779 A | 8/2013 |
| KR | 10-2013-0107995 A | 10/2013 |
| WO | WO 2011/037322 A2 | 3/2011 |

OTHER PUBLICATIONS

International Search Report, issued in PCT/KR2014/010347, dated Jan. 28, 2015.
Written Opinion of the International Searching Authority, issued in PCT/KR2014/010347, dated Jan. 28, 2015.

* cited by examiner

APPLICATION MODULE PROVIDED WITH STATIONARY INTERFACE

TECHNICAL FIELD

This application claims priority to and the benefit of Korean Patent Application No. 10-2013-0130745 filed in the Korean Intellectual Property Office on Oct. 31, 2013, the entire contents of which are incorporated herein by reference.

The present invention relates to an application module provided with a stationary interface, and more particularly, to an application module provided with a stationary interface performing functions of a battery management system (BMS), which transceive data from an application module data control device or call a service module included in basic software (BSW) to increase compatibility regarding function execution among one or more modules.

BACKGROUND ART

In general, batteries used for an electric vehicle (EV), a hybrid vehicle (HV), and a home or industry, that is, secondary batteries are high in application easiness depending on a product group and have electrical characteristics such as high energy density, and the like.

The secondary batteries have attracted public attention as a new energy source for environment-friendly and improvement of energy efficiency in that no by-product is generated depending on use of energy in addition to a primary advantage of remarkably reducing use of fossil fuel.

In this case, when multiple secondary batteries alternately perform charging and discharging, the multiple secondary batteries need to be managed so that the batteries maintain an appropriate operating state and performance by efficiently controlling the charging and discharging of the secondary batteries.

To this end, a battery management system (BMS) that manages a state and a performance of the battery is provided. The BMS measures current, voltage, a temperature, and the like of the battery to estimate a state of charging (SOC) of the battery based on the measured current, voltage, temperature, and the like and controls the SOC so that fuel consumption efficiency is highest. The SOC of the battery that performs the charging and discharging needs to be accurately measured in order to accurately control the SOC.

Meanwhile, since the battery management system in the related art cannot be standardized, functions of one or more application modules used in the battery management system in the related art are determined, and as a result, interfaces of the respective application modules cannot be compatible with each other and when a function of a new application module is added to a specific application module, a new interface should be designed and added due to an incompatible interface.

Further, in an AUTomotive System Architecture (AUTOSAR) meaning an automotive standard software architecture, an AUTOSAR compatible standard software module cannot be simultaneously applied to application layers of an opened AUTOSAR and a non-opened AUTOSAR (NON-AUTOSAR) in the related art, and as a result, there is inconvenience that the AUTOSAR compatible standard software module should be individually developed according to the opened AUTOSAR and the non-opened AUTOSAR.

Therefore, in order to solve the problems in a battery management system which is not standardized in the related art, the present inventor has invented an application module provided with a stationary interface, which can transceive data from an application module data control device or call a service module included in a basic program in an application module performing functions of a battery management system.

DETAILED DESCRIPTION OF THE INVENTION

Technical Problem

The present invention is contrived to solve the aforementioned problems and an object of the present invention is to provide an application module provided with a stationary interface performing functions of a battery management system, which can transceive data from an application module data control device or call a service module included in a basic program.

In more detail, another object of the present invention is to provide an application module provided with a stationary interface, which can transceive data with an application module data control device to write the corresponding data in a separate memory included in the application module data control device or read the written data.

Further, yet another object of the present invention is to provide an application module provided with a stationary interface, which calls one or more service modules included in a basic program through one or more interfaces to execute a hardware device connected with the corresponding service module.

Still another object of the present invention is to provide an application module provided with a stationary interface, which can change one or more interfaces corresponding to an application module to be added to correspond to the added application module.

Still yet another object of the present invention is to provide an application module provided with a stationary interface, which can execute functions of a plurality of corresponding application modules without a separate interface design process if the plurality of application modules transceive data through an application module data control device by one or more interfaces.

Technical Solution

Among exemplary embodiments, an exemplary embodiment of the present invention provides an application module including one or more data transceiving interfaces transceiving data from an application module data control device (data manager); and one or more call interfaces configured to call one or more service modules.

One or more data transceiving interfaces may connect the application module and the application module data control device so as to write the data in a separate memory included in the application module data control device or read the data written in the memory.

One or more data transceiving interfaces may include a write/read interface that allows the data to be written in the memory or the written data to be read and an address value receiving interface receiving an address value for the data written in the memory.

One or more call interfaces may allow a hardware device connected with one or more service modules to be executed by calling one or more service modules.

One or more call interfaces include a system service call interface calling a system service module among one or more service modules, a communication service call interface calling a communication service module among one or more service modules, an input/output service call interface calling an input/output service module among one or more service modules, and a memory service call interface calling a memory service module among one or more service modules.

Any one or more call interfaces among one or more call interfaces may be configured to be changed to an additional service call interface calling a remaining service module other than the system service module, the communication service module, the input/output service module, and the memory service module among one or more service modules.

The application module may transceive the data with the other application module connected with the application module data control device through one or more data transceiving interfaces.

Advantageous Effects

According to the present invention, since respective application modules do not directly share data but share the data through a separate application module data control device, interface compatibility among the respective application modules increases, and as a result, a separate interface design is not required.

Since one or more changeable interfaces according to a function are provided, the existing interface is changed and used regardless of the type of the application module to increase extendibility.

Further, since the present invention can be applied to all of the one or more application modules, the same type of stationary interface can be used, and as a result, the corresponding specific application module can be replaced for each application module when replacement of a specific application module is required.

A function of the interface can be changed to correspond to a function of the specific application module.

BEST MODE

Hereinafter, preferred embodiments will be presented in order to help understanding the present invention. However, the exemplary embodiments are just provided to easily understand the present invention and contents of the present invention are not limited to the exemplary embodiments.

Figure 1:
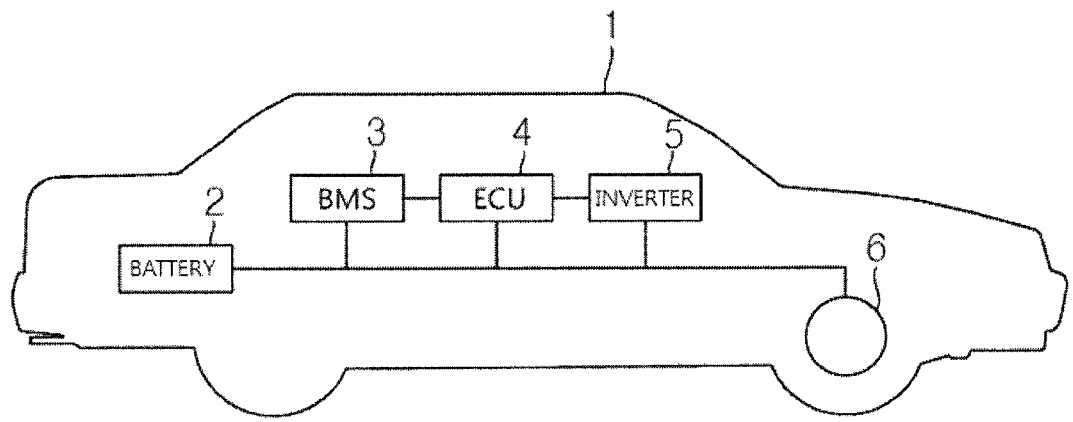
FIG. 1 is a block diagram illustrating a configuration of an electric vehicle 1.

FIG. 1 is a block diagram illustrating a configuration of an electric vehicle 1.

Referring to FIG. 1, in general, the electric vehicle 1 may be configured to include a battery 2, a battery management system (BMS) 3, an electronic control unit (ECU) 4, an inverter 5, and a motor 6.

The battery 2 is an electric energy source that drives the electric vehicle 1 by providing drive force to the motor 6. The battery 2 may be charged or discharged by the inverter 5 depending on driving of the motor 6 or an internal combustion engine (not illustrated).

Herein, the type of battery 2 is not particularly limited and may be constituted by, for example, a lithium ion battery, a lithium polymer battery, a nickel cadmium battery, a nickel hydrogen battery, a nickel zinc battery, and the like.

Further, the battery 2 is formed by a pack in which a plurality of battery cells are connected in series or in parallel. In addition, one or more packs are provided to form the battery 2.

The BMS 3 estimates a state of the battery 2 and manages the battery 2 by using the estimated state information. For example, the BMS 3 estimates and manages the state information of the battery 2, which includes a state of charging (SOC), a state of health (SOH), a maximum input/output power permission amount, an output voltage, and the like of the battery 2. In addition, the BMS 3 controls the charging or discharging of the battery 2 by using the state information and furthermore, may estimate an exchange time of the battery 2.

The ECU 4 is an electronic control apparatus that controls a state of the electric vehicle 1. For example, the ECU 4 determines a torque degree based on information including an accelerator, a brake, a speed, and the like and controls an output of the motor 6 to be suitable for torque information.

Further, the ECU 4 transmits a control signal to the inverter 5 so as to charge or discharge the battery 2 based on the state information including the SOC, SOH, and the like of the battery 2 received by the BMS 3.

The inverter 5 allows the battery 2 to be charged or discharged based on the control signal of the ECU 4.

The motor 6 drives the electric vehicle 1 based on control information (for example, torque information) received from the ECU 4 by using electric energy of the battery 2.

Since the electric vehicle 1 is driven by using the electric energy of the battery 2, the battery 2 and the motor 6 may be connected through various circuits.

Meanwhile, since functions of interfaces of one or more respective application modules connected with the battery 2 are determined in the BMS 3, the application modules may not be compatible with each other and when a new application module is added to a specific application module, a new interface needs to be designed and added due to an incompatible interface. Therefore, in the present invention, the application module 100 including the stationary interface will be described, which increases compatibility among the respective application modules by using the interface integrated through FIGS. 4 to 7 to be described below and does not require a separate application module design depending on realization of a new function.

Figure 2:
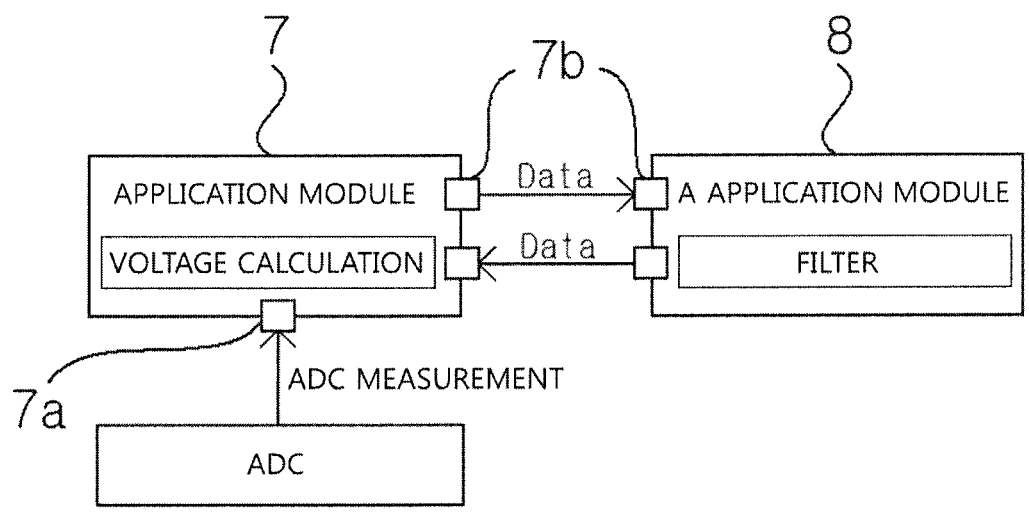
FIG. 2 is a diagram illustrating a state in which an A application module 8 having a filter interface 7b is added to an application module 7 in the related art on Project A.
Figure 3:
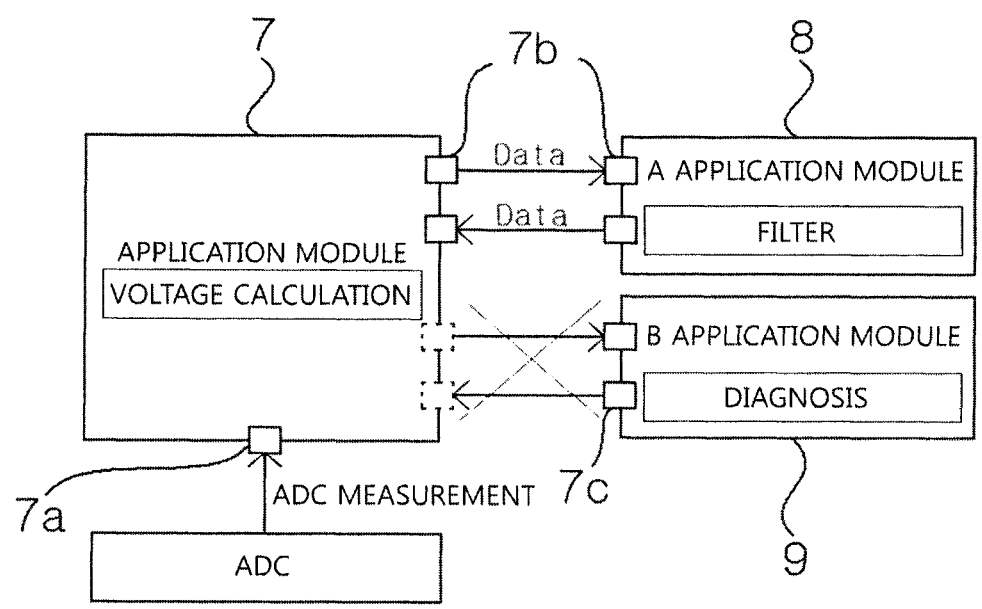
FIG. 3 is a diagram illustrating a state in which the A application module 8 and a B application module 9 having a diagnosis interface 7c are added to the application module 7 in the related art on Project B.

FIG. 2 is a diagram illustrating a state in which an A application module 8 having a filter interface 7*b* is added to an application module 7 in the related art on Project A. FIG. 3 is a diagram illustrating a state in which the A application module 8 and a B application module 9 having a diagnosis interface 7*c* are added to the application module 7 in the related art on Project B.

Referring to Project A illustrated in FIG. 2, Project A as a project in which the A application module 8 having the filter interface 7*b* is added to the application module 7 in the related art, an analog to digital converter (ADC) input interface 7*a* capable of receiving an ADC measurement value from an analog to digital converter (ADC), the ADC may be hardware and software, and may convert an analog signal to a digital signal, as known to one of ordinary skill in the art, and the ADC input interface 7*a* may be included in the application module 7 in the related art. Further, the filter interface 7*b* capable of transceiving data from the A application module 8 corresponding to the other type may be included in the application module 7 in the related art.

Therefore, since the application module 7 in the related art and the A application module 8 commonly include the filter interface 7*b*, the application module 7 in the related art and the A application module 8 may be compatible with each other.

Referring to Project B illustrated in FIG. 3, Project B as a project in which the A application module 8 and the B application module 9 having the diagnosis interface 7*c* are added to the application module 7 in the related art, the A application module 8 having the filter interface 7*b* and the B application module 9 having the diagnosis interface 7*c* are added to the application module 7 in the related art and in this case, since the diagnosis interface 7*c* is not provided in the application module 7 in the related art, the application module 7 may be compatible with the A application module 7, but may not be compatible with the B application module 9, and as a result, data may not be shared.

Therefore, in the present invention, the application module 100 including the stationary interface will be described in more detail with reference to FIGS. 4 to 7 to be described below, which does not include only a specific interface but may include one or more interfaces of which a function is changeable anytime as necessary.

Figure 4:
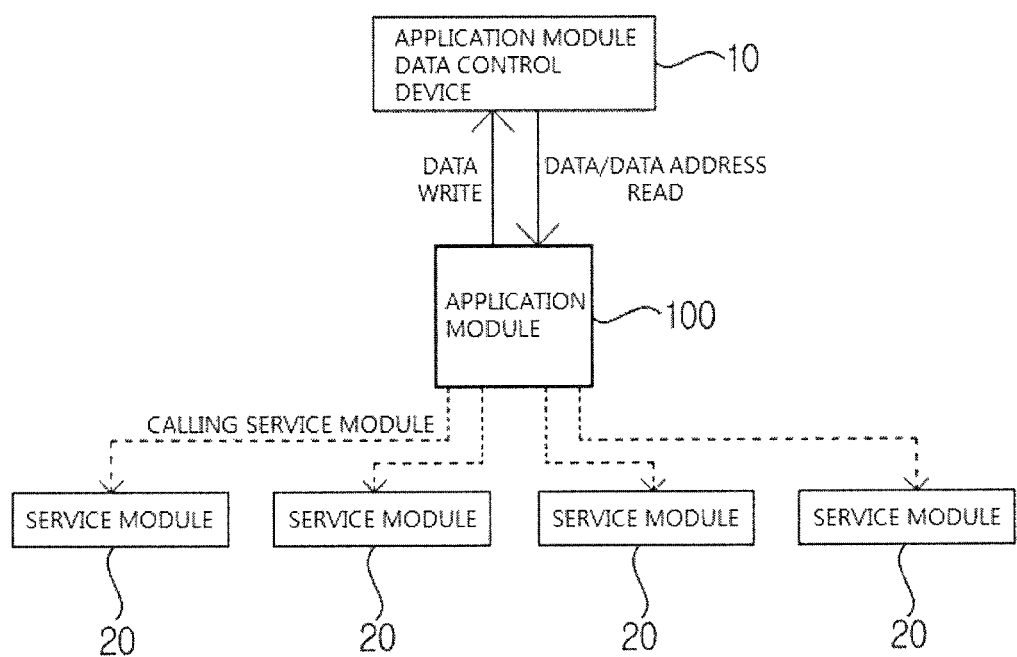
FIG. 4 is a diagram illustrating a schematic connection state of an application module 100 provided with a stationary interface according to an exemplary embodiment of the present invention.
Figure 5:
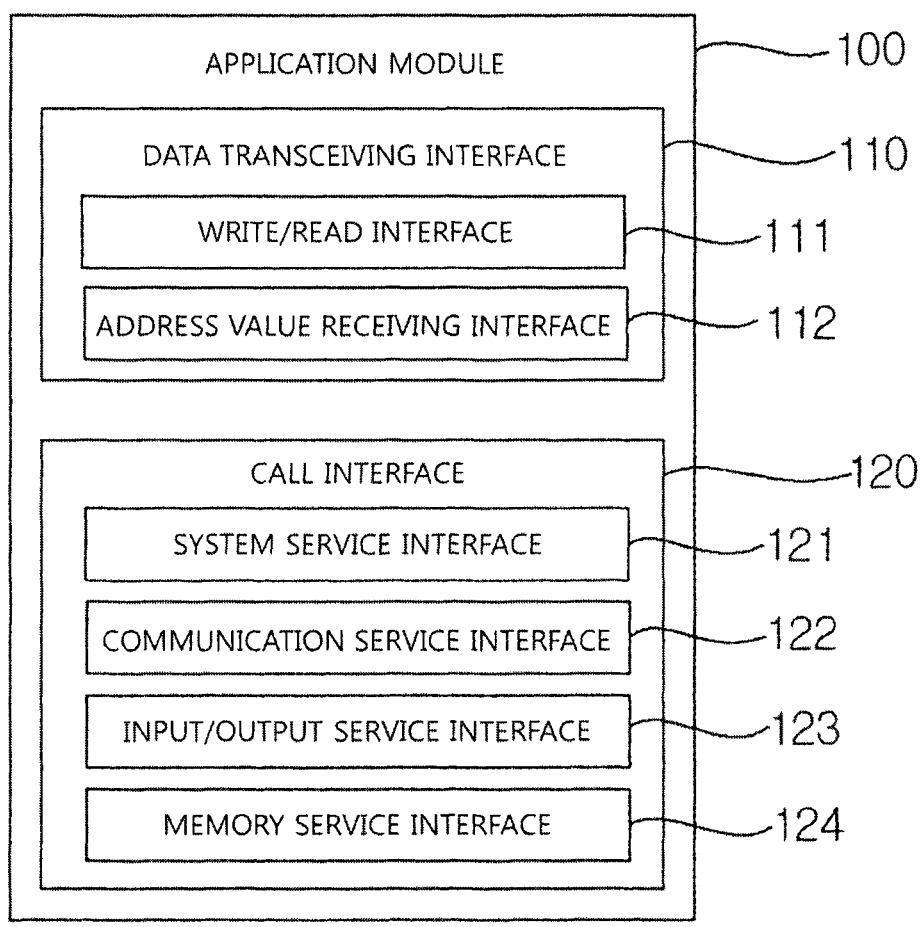
FIG. 5 is a block diagram illustrating, in more detail, a configuration of the application module 100 including the stationary interface illustrated in FIG. 4.

FIG. 4 is a diagram illustrating a schematic connection state of an application module 100 provided with a stationary interface according to an exemplary embodiment of the present invention. FIG. 5 is a block diagram illustrating, in more detail, a configuration of the application module 100 including the stationary interface illustrated in FIG. 4.

Referring to FIGS. 4 to 7, the application module 100 including the stationary interface according to the present invention includes one or more data transceiving interfaces 110 and one or more call interfaces 120.

First, the data transceiving interface 110 may serve to transceive data from the application module data control device (data manger) 10 and execute a function of the application module data control device 10 as well as the data.

Further, the data transceiving interface 110 may serve to connect the application module 100 including the stationary interface according to the present invention and the application module data control device 10 so as to write the data in a separate memory (not illustrated) included in the application module data control device 10 or read the data written in the memory (not illustrated).

The data transceiving interface 110 that performs such a role may include a first transceiving interface 111 that allows the data to be written in the memory (not illustrated) or the written data to be read and a second transceiving interface 112 receiving an address value for the data written in the memory.

Next, the call interface 120 may serve to call one or more service modules 20 included in the basic program (basic software (BSW)) and allow a hardware device (not illustrated) connected with one or more service modules 20 to be executed.

Herein, the basic program (BSW) may generally mean an operating system (OS) for operating the BMS 3. Herein, a service area that performs a hardware function may be present in an area of the basic program and one or more service modules 20 may be included in the corresponding service area. The service module 20 may include a system service module, a communication service module, an input/output (I/O) service module 10, and a memory service module.

Therefore, the call interface 120 may include a first call interface 121 calling the system service module among one or more service modules 20 described above, a second call interface 122 calling the communication service module, a third call interface 123 calling the I/O service module, and a fourth call interface 124 calling the memory service module.

The first to fourth call interfaces 121, 122, 123, and 124 may be configured to be changed to a fifth call interface (not illustrated) that may call the remaining service module other than the system service module, the communication service module, the I/O service module, and the memory service module among one or more service modules 20 described above. In other words, the functions of the respective call interfaces are not defined, but may be changed as necessary (according to the type of service module to be called).

Further, the call interface 120 may serve to execute a function of a hardware device connected with the service module 20.

Meanwhile, an operation of the application module 100 including the stationary interface according to the present invention will be described in more detail with reference to FIGS. 6 and 7.

Figure 6:
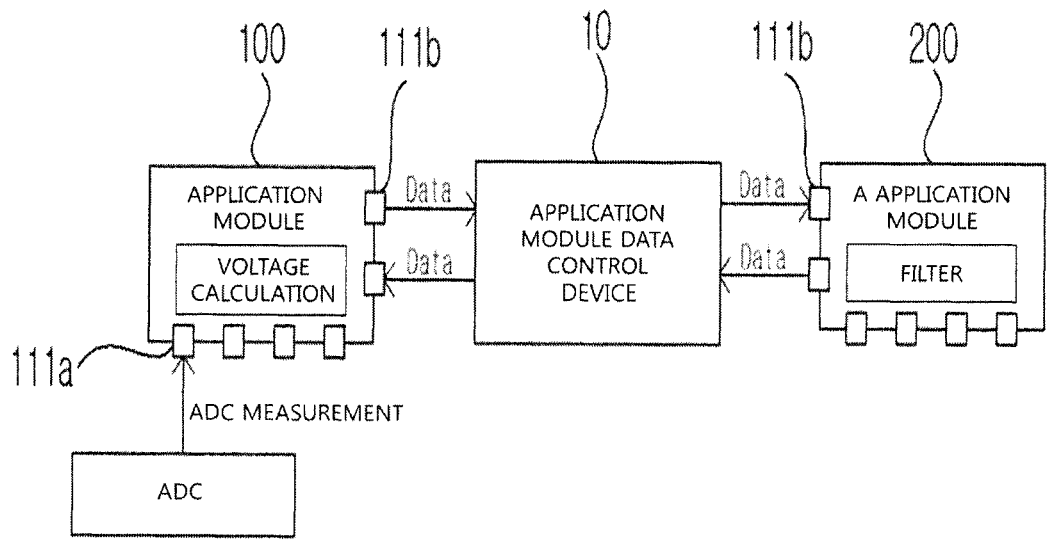
FIG. 6 is a diagram illustrating a state in which an A application module 200 having a filter interface 111b is added to the application module 100 according to the present invention on Project A.

FIG. 6 is a diagram illustrating a state in which an A application module 200 having a filter interface 111*b* is added to the application module 100 according to the present invention on Project A. FIG. 7 is a diagram illustrating a state in which the B application module 300 having a communication interface 111*c* and a diagnosis interface 111*d* is added to the application module 100 according to the present invention on Project B.

Referring to Project A illustrated in FIG. 6, Project A is a project in which the A application module 200 having the filter interface 111*b* is added to the application module 100 having the stationary interface according to the present invention, and an ADC input interface 111*a* capable of receiving an ADC measurement value may be included in the application module 100 including the stationary interface according to the present invention and further, the filter interface 111*b* capable of transceiving the data from the A application module 200 corresponding to the other type may be included in the application module 100 having the stationary interface according to the present invention.

Therefore, since the application module 100 including the stationary interface according to the present invention and the A application module 200 commonly include the filter interface 111*b*, the application module 100 and the A application module 200 may be compatible with each other while sharing the data through the application module data control device 10.

Figure 7:
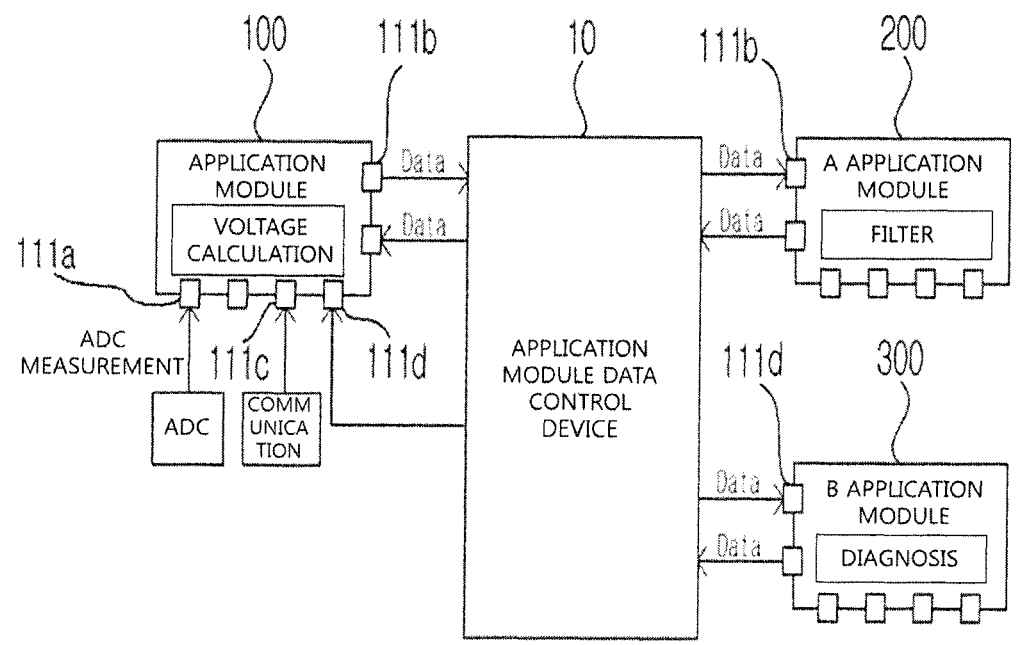
FIG. 7 is a diagram illustrating a state in which the B application module 300 having a communication interface 111c and a diagnosis interface 111d is added to the application module 100 according to the present invention on Project B.

Referring to Project B illustrated in FIG. 7, Project B is a project in which the A application module 200 and the B application module 300 having the communication interface 111c and the diagnosis interface 111d are added to the application module 100 including the stationary interface according to the present invention, and the A application module 200 having the filter interface 111b and the communication interface 111c and the B application module 300 having the diagnosis interface 111d are added to the application module 100 including the stationary interface according to the present invention. In this case, since both the communication interface 111c and the diagnosis interface 111d are provided in the application module 100 including the stationary interface according to the present invention, the application module 100 including the stationary interface according to the present invention is compatible with the A application module 200 and the B application module 300 to share the data.

The present invention has been described in detail with reference to the preferred embodiments. However, it will be appreciated by those skilled in the art that various modifications and changes of the present invention can be made within the scope without departing from the spirit and the scope which are defined in the appended claims and their equivalents.

The invention claimed is:

1. An application module, comprising:
a first plurality of data transceiving interfaces transceiving data from an application module data control device, each of the first plurality of data transceiving interfaces being a different type of interface than the remaining interfaces of the plurality of data transceiving interfaces;
a second plurality of call interfaces configured to call one or more service modules, each of the second plurality of call interfaces being a different type of interface than the remaining interfaces of the second plurality of call interfaces; and
an analog to digital converter input interface capable of receiving an analog to digital measurement value,
wherein the first plurality of data transceiving interfaces comprises a filter interface, a diagnosis interface and a communication interface,
wherein the second plurality of call interfaces comprises a system service interface, a communication service interface, an input/output service interface, and a memory service interface,
wherein the first plurality of data transceiving interfaces connect the application module and the application module data control device so as to write the data in a separate memory included in the application module data control device or read the data written in the memory,
wherein the first plurality of data transceiving interfaces include a write/read interface that allows the data to be written in the memory or the written data to be read,
wherein the second plurality of call interfaces allow a hardware device connected with a plurality of service modules to be executed by calling the plurality of service modules,
wherein each of the first plurality of data transceiving interfaces are configured to:
transceive data from a second application module via the application module data control device,
transmit data to the second application module via the application module data control device, and
execute a function of the application module data control device,
wherein the first application module and the second application module are hardware and software, and
wherein each call interface calls one or more respective service modules included in the basic software (BSW) for operating a battery management system (BMS) and allow a hardware device connected with one or more service modules to be executed.

2. The application module of claim 1, wherein the first plurality of data transceiving interfaces include an address value receiving interface receiving an address value for the data written in the memory.

3. The application module of claim 1, wherein the system service call interface calls a system service module among the plurality of service modules.

4. The application module of claim 1, wherein the communication service call interface calls a communication service module among the plurality of service modules.

5. The application module of claim 1, wherein the input/output service call interface calls an input/output service module among the plurality of service modules.

6. The application module of claim 1, wherein the memory service call interface calls a memory service module among the plurality of service modules.

7. The application module of claim 1, wherein any of the second plurality of call interfaces among the second plurality of call interfaces are configured to be changed to an additional service call interface calling a remaining service module other than the system service module, the communication service module, the input/output service module, and the memory service module among one or more service modules.

8. The application module of claim 1, wherein the application module transceives the data with the other application module connected with the application module data control device through the first plurality of data transceiving interfaces.

9. The application module of claim 1, wherein the data transceiving interfaces transceive data to measure current, voltage and temperature of a battery.

* * * * *